United States Patent [19]

Sollich

[11] 4,341,476
[45] Jul. 27, 1982

[54] APPARATUS FOR TREATING MATERIALS CONTAINING COCOA BUTTER

[75] Inventor: Helmut Sollich, Kalletal, Fed. Rep. of Germany

[73] Assignee: SOLLICH KG Spezialmaschinenfabrik, Bad Salzuflen, Fed. Rep. of Germany

[21] Appl. No.: 73,732

[22] Filed: Sep. 10, 1979

Related U.S. Application Data

[62] Division of Ser. No. 902,344, May 3, 1978, Pat. No. 4,195,935.

[51] Int. Cl.³ .............................................. B01F 7/00
[52] U.S. Cl. .................................. 366/293; 241/282.1
[58] Field of Search ............... 366/279, 293, 314, 315, 366/325, 604, 306; 241/277, 282.1, 282.2, 73, 79, 82.4, 86

[56] References Cited

U.S. PATENT DOCUMENTS

| 29,239 | 7/1860 | Bonnet | 241/282.2 X |
|---|---|---|---|
| 1,686,953 | 10/1928 | Brown | 241/282.2 |
| 1,916,192 | 7/1933 | David | 366/325 |
| 1,946,001 | 2/1934 | Schaul | 241/82.4 |
| 2,161,508 | 6/1939 | Ensor et al. | 366/325 |
| 2,417,184 | 3/1947 | Wagner et al. | 241/73 |
| 2,668,764 | 2/1954 | Nauta | 426/474 |
| 2,742,348 | 4/1956 | Spence et al. | 366/279 X |
| 2,957,203 | 10/1960 | Marshall | 366/325 X |
| 2,990,380 | 6/1961 | Auerbach et al. | 366/325 X |
| 3,034,010 | 3/1962 | Sperling | 366/314 |
| 3,036,614 | 5/1962 | Knapp | 366/343 |
| 3,053,297 | 9/1962 | Brundler | 241/282.2 X |
| 3,355,151 | 11/1967 | Menzel | 366/604 |
| 3,385,671 | 5/1968 | Axelsson | 366/604 |
| 3,650,510 | 3/1972 | Ansel | 366/325 |

FOREIGN PATENT DOCUMENTS

| 629172 | 4/1936 | Fed. Rep. of Germany | 241/82.4 |
|---|---|---|---|
| 46-35824 | 10/1971 | Japan | 241/282.1 |
| 51-87565 | 8/1976 | Japan | 366/279 |
| 295344 | 3/1954 | Switzerland | 241/282.1 |

Primary Examiner—Edward L. Roberts
Attorney, Agent, or Firm—Scully, Scott, Murphy & Presser

[57] ABSTRACT

An apparatus for treating materials containing cocoa butter with regard to air entrained therein in which rotating blades beat and distribute the air bubbles in the material into smaller sizes and evenly dispersed arrangement.

9 Claims, 2 Drawing Figures

APPARATUS FOR TREATING MATERIALS CONTAINING COCOA BUTTER

This is a division of application Ser. No. 902,344, filed May 3, 1978, now U.S. Pat. No. 4,195,935.

BACKGROUND OF THE INVENTION

1. Field of the Invention

The present invention relates to the treatment of materials containing cocoa butter with regard to the air entering therein during processing thereof. Hereby, the air is permitted to remain in the material, but is very uniformly and finely distributed throughout the material.

2. Discussion of the Prior Art

In order to implement this method, the applicant has already proposed an apparatus in which a plurality of separating elements are disposed in an axially mutually offset arrangement within a conduit which conveys the viscous material during its flow, with the elements imparting turbulent motion to the material, which then again flows together downstream of the elements. The separating elements, in essence, are stationary discs having slots through which the material is forced, so that the air bubbles are substantially reduced in size and finely distributed.

SUMMARY OF THE INVENTION

Accordingly, it is an object of the present invention to develop this apparatus in a manner as to increase the intensity with which the air bubbles are reduced in size while at least the constructional demands are not increased.

In order to attain the inventive purpose, it is proposed that the separating elements comprise rotating blades which beat and distribute the air bubbles which are entrained in the material. Further features of the invention will become readily apparent from the claims and the following detailed description of the exemplified embodiment illustrated in the accompanying drawing.

BRIEF DESCRIPTION OF THE DRAWINGS

Reference may now be had to an exemplary embodiment of an apparatus constructed pursuant to the invention; taken in conjunction with the accompanying drawings; in which.

DETAILED DESCRIPTION

Figure 1:
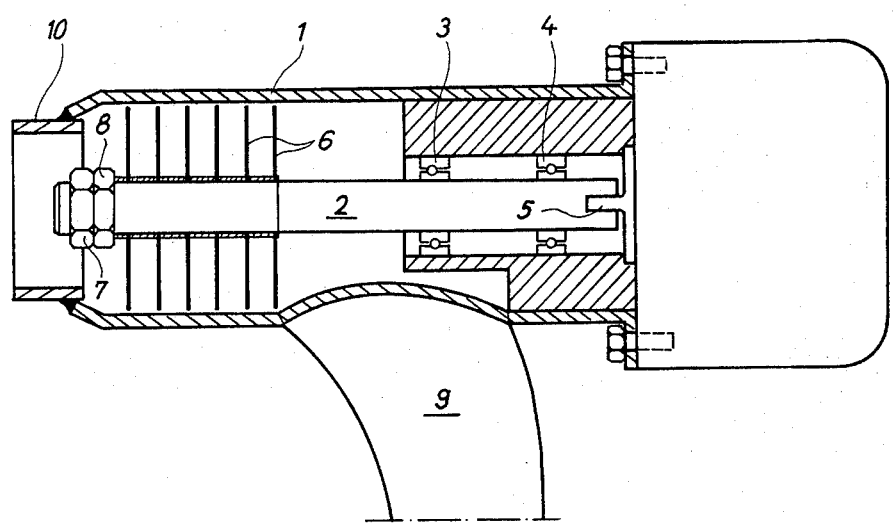
FIG. 1 is a longitudinal sectional view through an apparatus for the treatment of cocoa butter constructed in accordance with the invention.
Figure 2:
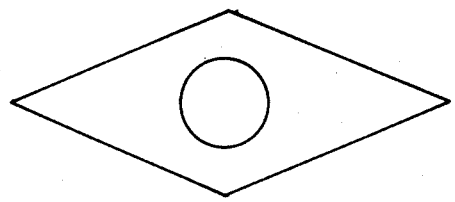
FIG. 2 is an enlarged end view of a blade utilized in the apparatus of FIG. 1.

As shown in FIG. 1 of the drawing, a shaft 2 is rotatably mounted in a housing 1 by being journaled at one end thereof in axially spaced bearings 3, 4, so as to be essentially cantilevered. The shaft 2 is rotated through the intermediary of a coupling 5 by a drive motor which is disposed exteriorly of the housing 1. A number of blades 6, having a configuration as shown in FIG. 2, are provided proximate the free end of the shaft, being axially spaced and circumferentially offset relative to each other. The blades taper symmetrically from a bearing collar to two points 180° apart. The innermost blade on the shaft bears against a collar formed on the shaft 2, while the stack of blades is rigidly maintained against the collar by means of lock nuts 7, 8 so as to be restrained from movement relative to the shaft.

The substance for processing is supplied through a lateral feed pipe 9, the material being discharged from the apparatus through an end spigot 10 which is coaxial with the interior of housing 1 and shaft 2. The configuration of the bearing housings prevents the material from leaving the housing 1 at the end at which the bearings 3, 4 are located.

When chocolate is supplied by suitable conveying means (not shown) to the housing 1 through the feed pipe 9, it must pass through the zone of the rotating blades, during which air bubbles which are entrained in the substance are beaten at a high degree of energy and very effectively into extremely small bubbles, with these bubbles being uniformly distributed throughout the chocolate material.

The number of blades which are employed in the apparatus depends upon conditions at any current time. For the usual conditions, between seven and twelve have proven suitable. The working edges of the blades are sharpened at the top in order to assist their operative effect.

What is claimed is:

1. In an apparatus for treating substantially viscous materials containing cocoa butter with regard to the air entering therein during processing thereof and which is left in the material but finely and uniformly distributed therein; a plurality of separating elements axially spaced from each other; and conduit means for carrying the viscous material during its flow, said elements being arranged in said conduit means and imparting turbulent motion to the material, which flows together again downstream of said elements, the improvement comprising: said conduit means comprising a housing having a rotatable shaft having said separating elements attached thereto, said housing comprising a lateral feed pipe which provides the viscous material with a directed flow onto the separating elements; said housing also comprising an end spigot positioned at one end of said shaft so as to position said separating elements between said spigot and said lateral feed pipe; said separating element being rotating blades which beat and distribute the air bubbles entrained in the material, said blades being equally spaced and positioned on a shaft, said blades having a sharpened working edge and are arranged longitudinally along said shaft wherein the area between said blades is occupied only by said substantially viscous material.

2. Apparatus as claimed in claim 1, each said element comprising a blade tapering symmetrically from a bearing collar to two points spaced 180° apart.

3. Apparatus as claimed in claim 1, said blades being supported proximate the free end of a cantilevered shaft.

4. Apparatus as claimed in claim 1, comprising seven to twelve blades being mounted on said shaft.

5. Apparatus as claimed in claim 1, comprising a motor disposed externally of the housing for driving said blade-supporting shaft.

6. In an apparatus for treating substantially viscous materials containing cocoa butter with regard to the air entering therein during processing thereof and which is left in the material but finely and uniformly distributed therein; a plurality of separating elements axially spaced from each other; and conduit means for carrying the viscous material during its flow, said elements being arranged in said conduit means and imparting turbulent motion to the material, which flows together again downstream of said elements, the improvement comprising: said conduit means comprising a housing having a rotatable shaft having said separating elements attached thereto, said housing comprising a lateral feed pipe which provides the viscous material with a directed flow onto the separating elements; said housing also comprising an end spigot positioned at one end of said shaft so as to position said separating elements between said spigot and said lateral feed pipe; said separating elements being rotating blades which beat and distribute the air bubbles entrained in the material, said blades being equally spaced and positioned on a shaft, said blades having a sharpened working edge and are arranged longitudinally along said shaft wherein the area between said blades is occupied only by said substantially viscous material and each said element comprising a blade tapering symmetrically from a bearing collar to two points spaced 180° apart.

7. Apparatus as claimed in claim 6, said blades being supported proximate the free end of a cantilevered shaft.

8. Apparatus as claimed in claim 6, comprising seven to twelve blades being mounted on said shaft.

9. Apparatus as claimed in claim 6, comprising a motor disposed externally of the housing for driving said blade-supporting shaft.

* * * * *